(12) United States Patent
Yang et al.

(10) Patent No.: US 12,333,766 B2
(45) Date of Patent: Jun. 17, 2025

(54) METHOD FOR TRAINING DEPTH ESTIMATION MODEL, ELECTRONIC DEVICE AND READABLE STORAGE MEDIUM

(71) Applicant: HON HAI PRECISION INDUSTRY CO., LTD., New Taipei (TW)

(72) Inventors: Jung-Hao Yang, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 463 days.

(21) Appl. No.: 17/892,288

(22) Filed: Aug. 22, 2022

(65) Prior Publication Data

US 2023/0410373 A1 Dec. 21, 2023

(30) Foreign Application Priority Data

Jun. 21, 2022 (CN) .................... CN202210706746.9

(51) Int. Cl.
*G06T 7/00* (2017.01)
*G06T 7/593* (2017.01)

(52) U.S. Cl.
CPC ................ *G06T 7/97* (2017.01); *G06T 7/593* (2017.01); *G06T 2207/20081* (2013.01); *G06T 2207/20228* (2013.01)

(58) Field of Classification Search
CPC . G06T 7/97; G06T 7/593; G06T 2207/20081; G06T 2207/20228; G06T 2207/20084; G06T 2207/10012; G06T 2207/30252
See application file for complete search history.

(56) References Cited

U.S. PATENT DOCUMENTS

| | | | | |
|---|---|---|---|---|
| 8,587,638 | B2* | 11/2013 | Pockett | H04N 13/122 348/54 |
| 9,729,865 | B1* | 8/2017 | Kuo | G06F 1/1686 |
| 11,694,353 | B2* | 7/2023 | Ninan | G06T 5/50 382/154 |
| 12,260,577 | B2* | 3/2025 | Chien | G06T 7/50 |
| 2020/0074212 | A1* | 3/2020 | Amano | G06V 10/26 |
| 2020/0167645 | A1* | 5/2020 | Huang | G06F 3/14 |
| 2021/0150278 | A1* | 5/2021 | Dudzik | G06T 7/593 |
| 2021/0158566 | A1* | 5/2021 | Ogawa | G06N 3/045 |
| 2021/0312650 | A1* | 10/2021 | Ye | G06T 7/174 |
| 2022/0383530 | A1* | 12/2022 | Giryes | G03B 35/08 |

* cited by examiner

*Primary Examiner* — Tom Y Lu
(74) *Attorney, Agent, or Firm* — ScienBiziP, P.C.

(57) ABSTRACT

A method for training a depth estimation model is provided. The method includes obtaining a first left image and a first right image. A disparity map is obtained by inputting the first left image into a depth estimation model. A second right image is obtained by adding the first left image to the disparity map. The first left image is converted into a third right image. A mask image is obtained by performing a binarization processing on a pixel value of each of pixel points of the third right image. Once a loss value of the depth estimation model is obtained by calculating a mean square error of pixel values of all corresponding pixel points of the first right image, the second right image, and the mask image, a depth estimation model is iteratively trained according to the loss value.

20 Claims, 5 Drawing Sheets

METHOD FOR TRAINING DEPTH ESTIMATION MODEL, ELECTRONIC DEVICE AND READABLE STORAGE MEDIUM

FIELD

The present disclosure relates to a technical field of machine vision, in particular to a method for training a depth estimation model, an electronic device, and a readable storage medium.

BACKGROUND

Depth estimation of images is a challenge in the field of machine vision. The depth estimation of objects in images can be applied to autonomous driving, scene understanding, robotics, 3D reconstruction, photography, intelligent medicine, intelligent human-computer interaction, space mapping, augmented reality and other fields. For example, in the field of autonomous driving, depth information from images can be used to identify obstacles in front of a vehicle, and whether there are pedestrians or other vehicles in front of the vehicle.

Depth estimation needs to obtain depth information by reconstructing an image. However, with the current depth estimation method, when a binocular image input to a training model has differences between pixels (pixel differences), i.e., when a left image and a right image are inconsistent, a predicted value output by the training model may deviate, which reduces the reliability of the trained model. This affects the accuracy of depth estimation.

DETAILED DESCRIPTION

Figure 1:
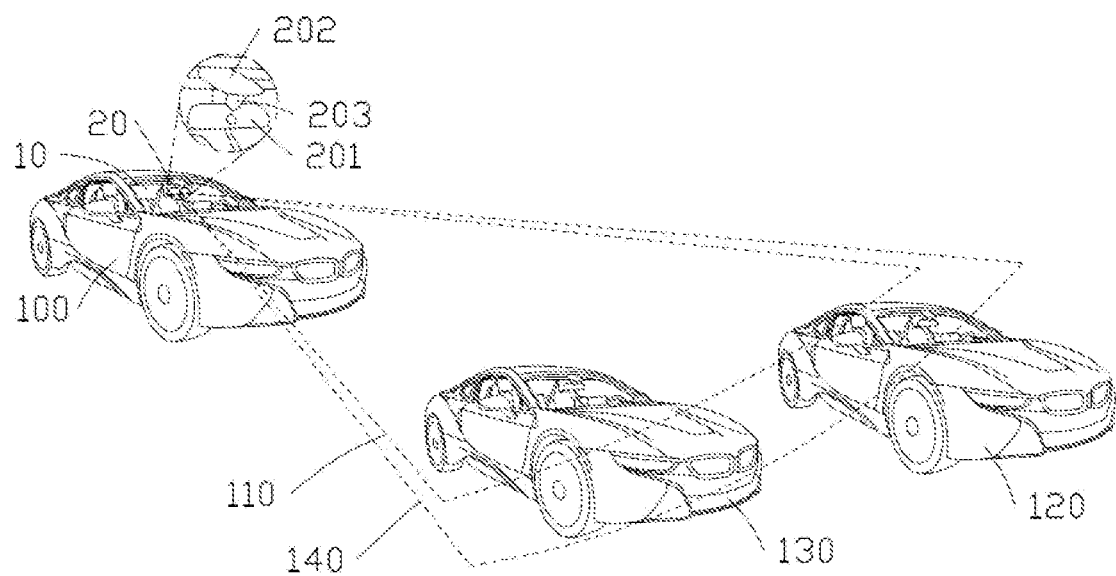
FIG. 1 is a schematic diagram of an applied scenario of a depth estimation method provided by an embodiment of the present disclosure.

It should be noted that, in the embodiments of the present disclosure, "at least one" refers to one or more, and "a plurality of" refers to two or more. "And/or", which describes a relationship between associated objects, means that there can be three relationships. For example, A and/or B can mean: A alone exists, A and B exist at the same time, and B exists alone, where A, B can be singular or plural. The terms "first", "second", "third", "fourth", etc. (if present) in the description and claims of this disclosure and the drawings are used to distinguish between similar objects, not to describe a particular order or sequence.

In addition, it should be noted that the methods disclosed in the embodiments of the present disclosure or the methods shown in the flowcharts include one or more blocks for implementing the methods, and the plurality of blocks are not to deviate from the scope of the claims. The order of execution can be interchanged, and some of the blocks can also be omitted.

Some terms in the embodiments of the present disclosure are explained below to facilitate understanding by those skilled in the art.

1. Depth Estimation

Depth estimation is used to obtain information as to distance (distance information) from each pixel representing an object in an image to a camera. An image containing distance information is called as a depth image.

2. Parallax

Pixel coordinates of a same object in two images are different, differences in pixel coordinates of the object closer to the camera are greater than differences in pixel coordinates of the object farther away from the camera. The differences in pixel coordinates of a point in a same world coordinate system in different images is parallax. The parallax between different images can be converted into a distance, i.e., the depth, from the object to the camera according to parameters of the camera.

An image (such as a left image) of a stereoscopic image pair (including the left image and a right image) is used as a reference image, and its size is same as a size of the reference image, and an image whose element value equals a disparity value is called a disparity map. Disparity estimation is a process of obtaining disparity values of corresponding pixels between the left image and the right image, i.e., a stereo matching process.

3. Autoencoder (AE)

An autoencoder is a class of artificial neural networks (ANNs) used in semi-supervised learning and unsupervised learning, which perform representation learning on input information by taking input information as a learning target. The autoencoder consists of two parts: an encoder and a decoder. According to a learning paradigm, the autoencoder can be a contractive autoencoder, a regularized autoencoder, or a variational autoencoder (VAE). Depending on a type of construction, the autoencoder can be a neural network with a feedforward structure or a recursive structure.

4. Camera Calibration

Camera calibration is a process of resolving internal and external parameters of a camera by using preset initial parameters according to a relationship between a pixel coordinate system and a world coordinate system. The initial parameters may include a focal length of the camera and a pixel size of a calibration image. The internal and external parameters can include internal parameters and external parameters. The internal parameters refer to parameters related to the camera's own characteristics, such as the camera's focal length, distortion coefficient, zoom coefficient, origin coordinates of the calibrated image, and the pixel size of the calibrated image. External parameters refer to parameters in the world coordinate system, such as a rotation of the camera and an offset in space. The world coordinate system refers to a predefined three-dimensional space coordinate system. The pixel coordinate system refers to a coordinate system in which a pixel of an image is used as a unit.

The following describes a depth estimation method provided by the embodiment of the present disclosure which is applied to an automatic driving scenario. It can be understood that the depth estimation method provided by the embodiment of the present disclosure is not limited to be applied to the automatic driving scenario.

Referring to FIG. 1, FIG. 1 is a schematic diagram of an applied scenario of the depth estimation method provided by the embodiment of the present disclosure.

As shown in FIG. 1, a vehicle 100 includes a depth estimation system 20, which is disposed in an interior compartment behind a windshield 10 of the vehicle 100. The depth estimation system includes a camera device 201, a distance acquisition device 202, and a processor 203. The processor 203 is electrically connected to the camera device 201 and the distance acquisition device 202.

It can be understood that the camera device 201, the distance acquisition device 202 and the processor 203 can be installed in other positions on the vehicle 100, so long as the camera device 201 can acquire images of a scene in front of the vehicle 100, and the distance acquisition device 202 can detect distances of objects in front of the vehicle 100. For example, the camera device 201 and the distance acquisition device 202 may be located in a metal grille or a front bumper of the vehicle 100. Further, although FIG. 1 shows only one distance acquisition device 202, there may be a plurality of distance acquisition devices 202 on the vehicle 100, respectively pointing in different directions (such as to the side, to the front, to the back, etc.). The plurality of distance obtaining devices 202 may be disposed at positions such as the windshield, door panels, bumpers, or metal grilles.

In this embodiment, the camera device 201 can capture images of scenes in front of and on both sides of the vehicle 100. As shown in FIG. 1, the camera device 201 may detect a horizontal coverage area 110 (shown by a dashed line) in which two objects, e.g., a vehicle 120 and a vehicle 130, are present. The camera device 201 can capture images of the vehicle 120 and the vehicle 130 in front of the vehicle 100.

In some embodiments, the camera device 201 may be a binocular camera or a monocular camera.

In some embodiments, the camera device 201 may be a driving recorder. The driving recorder is used to record information such as images and sounds during driving of the vehicle 100. Wherein, after the vehicle 100 is installed with the driving recorder, the driving recorder can record the images and sounds of the entire driving process of the vehicle 100, thereby providing effective evidence for traffic accidents. As an example, in addition to the above functions, the driving recorder may also include functions such as global positioning system (GPS) positioning, driving track capture, remote monitoring, electronic dog, navigation, etc. This is not specifically limited.

The distance obtaining device 202 may be used to detect objects in front of and on both sides of the vehicle 100 to obtain distances between the objects and the distance obtaining device 202. As shown in FIG. 1, the distance obtaining device 202 on the vehicle 100 may obtain the distance between the vehicle 120 and the distance obtaining device 202, and obtain the distance between the vehicle 130 and the distance obtaining device 202. The distance acquisition device 202 may be an infrared sensor, a laser radar (Lidar), a radar, or the like.

Taking an example of the distance obtaining device 202 being a radar, the radar utilizes radio frequency (RF) waves to determine the distance, direction, speed and/or height of objects in front of the vehicle. Specifically, a radar includes a transmitter and a receiver, the transmitter transmits RF waves (radar signals), and the RF waves encounter objects on their path and are reflected. RF waves reflected back by the objects return a small fraction of their energy to the receiver. As shown in FIG. 1, the radar is configured to transmit radar signals through the windshield in the horizontal coverage area 140 and to receive radar signals reflected by any objects within the horizontal coverage area 140. A 3D point cloud image of any object within the horizontal coverage area 140 can thereby be obtained.

In this embodiment, the horizontal coverage area 110 and the horizontal coverage area 140 may completely or partially overlap.

In some embodiments, the camera device 201 may capture images of a scene within the horizontal coverage area 110 periodically at a first rate. Likewise, the radar may capture three-dimensional point cloud images of the scene within the horizontal coverage area 140 periodically at a second rate. The first rate and the second rate may be the same or different. The images captured by each camera device 201 and the three-dimensional point cloud images captured by the radar may be marked with time stamps. When the first rate and the second rate are different, the time stamps can be used for further processing (e.g., image fusion) of the images captured by each camera device 201 and the three-dimensional point cloud images captured by the radar which are captured at the same or nearly the same time.

Among them, the three-dimensional point cloud, also known as laser point cloud (PCD) or point cloud, and can be a collection of massive points that express a spatial distribution of a target and characteristics of a surface of the target by using the laser to obtain the 3D spatial coordinates of each sampling point on the surface of the object under the same spatial reference system. Compared with the image, the three-dimensional point cloud is rich in three-dimensional space information, that is, the distance information between the object and the distance acquisition device 202 is included.

Exemplarily, as shown in FIG. 1, at time T0, the camera device 201 may acquire images of the vehicle 120 and the vehicle 130. At the same time (time T0), the distance obtaining device 202 can also obtain the three-dimensional point cloud image in the horizontal coverage area 140, i.e., the distance information between the vehicle 120 and the distance obtaining device 202, and the distance information between the vehicle 130 and the distance obtaining device 202 can be obtained at the time T0.

In this embodiment, the processor 203 may include one or more processing units. For example, the processor 203 may include, but is not limited to, a disclosure processor (AP), a modem processor, a graphics processing Unit (GPU), an image signal processor (ISP), a controller, a video codec, a digital signal processor (DSP), a baseband processor, a neural network processing unit (NPU), etc. Wherein, different processing units may be independent devices, or may be integrated in one or more processors.

In one embodiment, the depth estimation system 20 may further includes a storage device which is stored with computer program and/or modules, and the processor 203 executes or obtains the computer programs and/or modules stored in the storage device, and calls up the data stored in the storage device, such that various functions of the vehicle 100 are realized. For example, the processor 203 may execute the computer program stored in the storage device to identify depth information of objects based on the images of the scene captured by the camera device 201 and the distance information of the scene captured by the distance acquisition device 202 at a same moment. The objects may be other vehicles, pedestrians, road signs or obstacles.

It can be understood that the structure illustrated in this embodiment does not constitute a specific limitation on the depth estimation system. In other embodiments the depth estimation system may include more or fewer components than shown, or some components may be combined, or some components may be split, or a different arrangement of components.

Figure 2:
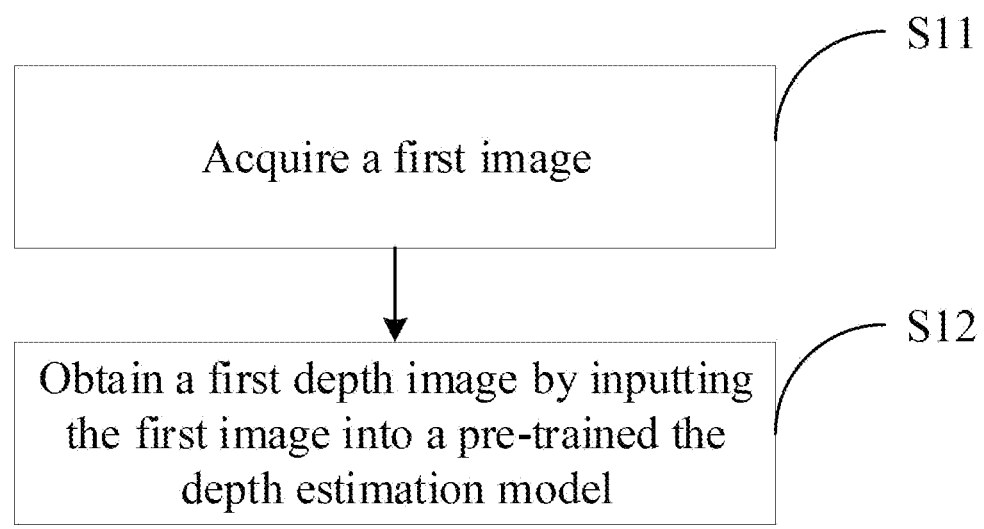
FIG. 2 is a flowchart of the depth estimation method provided by an embodiment of the present disclosure.

Referring to FIG. 2, FIG. 2 is a flowchart of a depth estimation method provided by an embodiment of the present disclosure.

The depth estimation method can be applied to the depth estimation system 20 as shown in FIG. 1. As shown in FIG. 2, the depth estimation method may include the following blocks:

S11, the processor 203 of the depth estimation system 20 acquires a first image.

In this embodiment, the processor 203 of the depth estimation system 20 may control the camera device 201 to capture images of a scene in front of the vehicle and obtain the first image. In this embodiment, the camera device 201 is a monocular camera, the monocular camera can shoot a video, and the processor 203 of the depth estimation system cuts out a frame of image from the video as the first image. Alternatively, the processor 203 controls the monocular camera to capture an image, and determines the captured image as the first image.

S12, the processor 203 of the depth estimation system 20 obtains a first depth image by inputting the first image into a pre-trained depth estimation model.

In some embodiments, the pre-trained depth estimation model may include an autoencoder (AE) and an image conversion module. After the processor 203 of the depth estimation system 20 inputs the first image into the pre-trained depth estimation model, the autoencoder processes the first image and outputs a disparity map corresponding to the first image. The image conversion module then converts the disparity map into the first depth image and outputs the first depth image.

In other embodiments, the pre-trained depth estimation model may not include the image conversion module. The pre-trained depth estimation model processes the first image, and outputs the disparity map corresponding to the first image. The processor 203 of the depth estimation system 20 then converts the disparity map into the first depth image.

A training method of the pre-trained depth estimation model is described in detail below.

Figure 3:
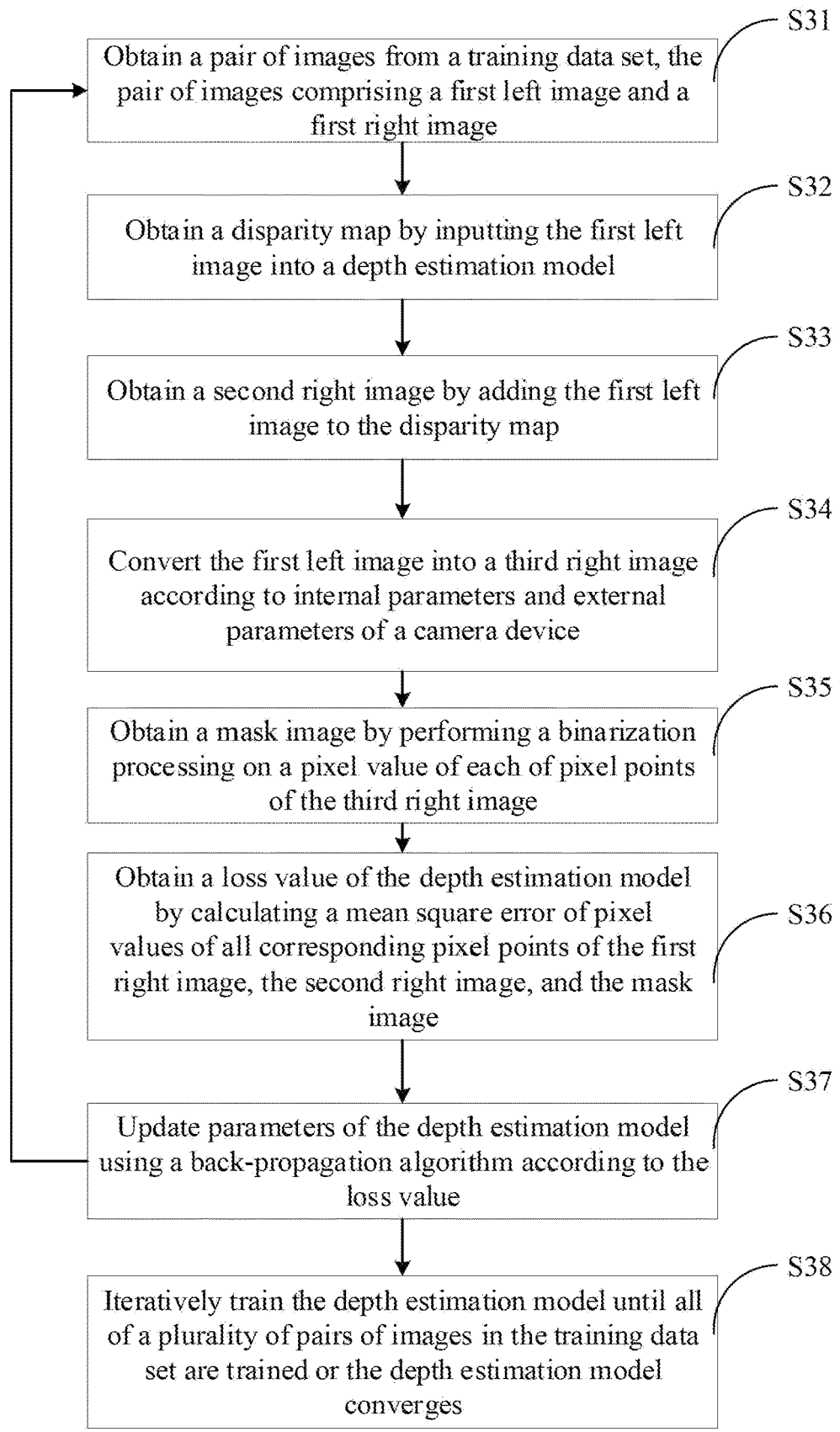
FIG. 3 is a flowchart of a method for training a depth estimation model provided by an embodiment of the present disclosure.

Referring to FIG. 3, FIG. 3 is a flowchart of a method for training a depth estimation model (e.g., the pre-trained depth estimation model mentioned above) provided by an embodiment of the present disclosure. The method for training the depth estimation model can be applied to an electronic device such as an electronic device 60 shown in FIG. 6.

S31, the electronic device obtains a pair of images from a training data set.

Wherein, the training data set includes a plurality of pairs of images. Each of the plurality of pairs of images includes a first left image and a first right image.

It can be understood that a pair of images refers to two images of a same scene captured by a camera device at a same moment, and the two images includes a left image and a right image. The left image and the right image have a same size and a same number of pixel points.

In this embodiment, the training data set may be a data set of images captured by a binocular camera of the vehicle 100 when the vehicle 100 is driving. Each pair of images include two images that are respectively captured by two cameras of the binocular camera and the two images correspond to a same scene and a same capture time.

S32, the electronic device obtains a disparity map by inputting the first left image into a depth estimation model to be trained.

It can be understood that the depth estimation model to be trained is an initialization model. Parameters of the initialization model can be set as required.

S33, the electronic device obtains a second right image by adding the first left image to the disparity map.

Among them, the second right image is a right image predicted by the depth estimation model. The second right image and the first right image have the same size and the same number of pixel points.

S34: the electronic device converts the first left image into a third right image according to internal parameters and external parameters of the camera device.

In one embodiment, the camera device includes a left camera and a right camera. The third right image and the first left image have the same size and the same number of pixel points.

It can be understood that the internal parameters and external parameters of the camera device can be obtained through camera calibration.

In one embodiment, the camera device can be a device that captures the pair of images obtained at S31.

In other embodiments, the internal parameters and external parameters of the camera device are the same as the internal parameters and external parameters of a device that captures the pair of images obtained at S31.

S35: the electronic device obtains a mask image by performing a binarization processing on a pixel value of each of pixel points of the third right image.

The binarization processing refers to setting the pixel values of pixel points to be 1 or 0. The mask image and the third right image have the same size and the same number of pixel points.

It can be understood that in the process of converting the first left image into the third right image, due to the pixel differences in the binocular image, some pixel points will fail to be converted, and the pixel values of the pixel points that fail to be converted becomes 0 at a corresponding position in the third right image.

S36: the d electronic device obtains a loss value of the depth estimation model by calculating a mean square error (MSE) of pixel values of all corresponding pixel points of the first right image, the second right image, and the mask image.

The corresponding pixel points refer to the pixel points with corresponding positional relationship in the three images, i.e., the first right image, the second right image, and the mask image. For example, if the first right image includes a first pixel point, the second right image includes a second pixel point corresponding to the first pixel point, and the mask image includes a third pixel point corresponding to the first pixel point, then a position of the first pixel point of the first right image, a position of the second pixel point of the second right image, and a position of the third pixel point of the mask image are all the same.

In this embodiment, a formula (1) for calculating the mean square error (MSE) of pixel values of three corresponding pixel points of the first right image, the second right image and the mask image is:

$$MSE = \frac{1}{n}\sum_{i=1}^{n} m_i * (y_i - \hat{y}_i)^2 \tag{1}$$

Among them, $m_i$ represents the pixel value of the ith pixel point of the mask image, $m_i$ represents 1 or 0, n represents a total number of all pixel points with $m_i$ being equal to 1 in the mask image, $y_i$ represents the pixel value of the ith pixel point of the first right image, and $\hat{y}_i$ represents the pixel value of the ith pixel point of the second right image.

In this embodiment, the mean square error can be used to measure a pixel value difference between the corresponding pixels in the first right image and the second right image, and some problematic pixel points are filtered by pixel values of the corresponding pixel points of the mask image. Minimizing the mean square error can minimize the difference between the pixel values of two corresponding pixel points of the first right image and the second right image. The smaller the value of the mean square error, the higher the prediction accuracy of the depth estimation model. When the mean square error is 0, it means that the pixel values of the two corresponding pixel points are the same, that is, the predicted value of the depth estimation model is the same as a real value.

In this embodiment, the mean square error calculated by formula (1) is used as the loss value of the depth estimation model. When the loss value of the depth estimation model is 0, the depth estimation model converges.

S37, the electronic device updates parameters of the depth estimation model using a back-propagation algorithm according to the loss value, so as to reduce a loss between an actual value and a predicted value.

S38: the electronic device iteratively trains the depth estimation model by executing blocks S31 to S37 in a loop until all of the plurality of pairs of images in the training data set are trained or the depth estimation model converges.

In some embodiments, the training of the depth estimation model ends when all of the plurality of pairs of images in the training data set are trained, and parameters of the depth estimation model with a smallest loss value are selected as final model parameters.

In other embodiments, during the training process, when the depth estimation model converges, the training ends, and the parameters of the converged depth estimation model are used as the final model parameters.

It can be understood that, in this embodiment, the loss value of the depth estimation model is combined with the pixel values of pixel points of the mask image, which can filter out some problematic pixel points and improve the prediction accuracy of the depth estimation model. Using the depth estimation model of this embodiment to acquire depth images can improve the accuracy of depth information.

Figure 4:
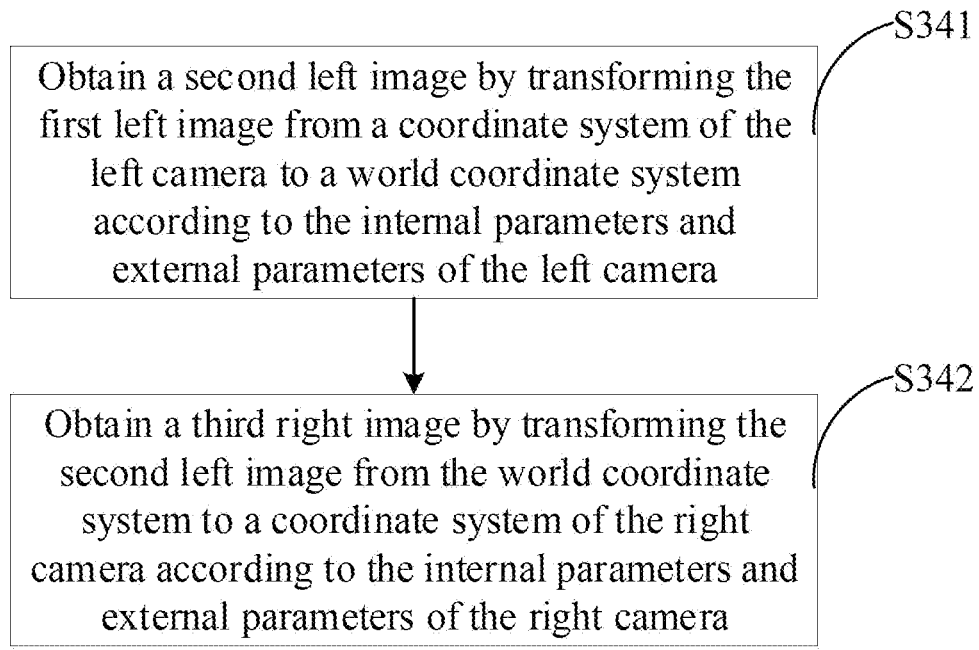
FIG. 4 is a flow chart of sub-blocks of block S34 in FIG. 3.

FIG. 3 and FIG. 4 may be referred to together. FIG. 4 is a flowchart of sub-blocks of block S34 in FIG. 3.

Specifically, in block S34 of FIG. 3, the converting the first left image into the third right image according to internal parameters and external parameters of the camera device includes the following sub-blocks:

S341, the electronic device obtains a second left image by transforming the first left image from a coordinate system of the left camera to a world coordinate system according to the internal parameters and external parameters of the left camera.

S342, the electronic device obtains a third right image by transforming the second left image from the world coordinate system to a coordinate system of the right camera according to the internal parameters and external parameters of the right camera.

In this embodiment, through two coordinate transformations, the first left image in the coordinate system of the left camera can be converted into the third right image in the coordinate system of the right camera.

Figure 5:
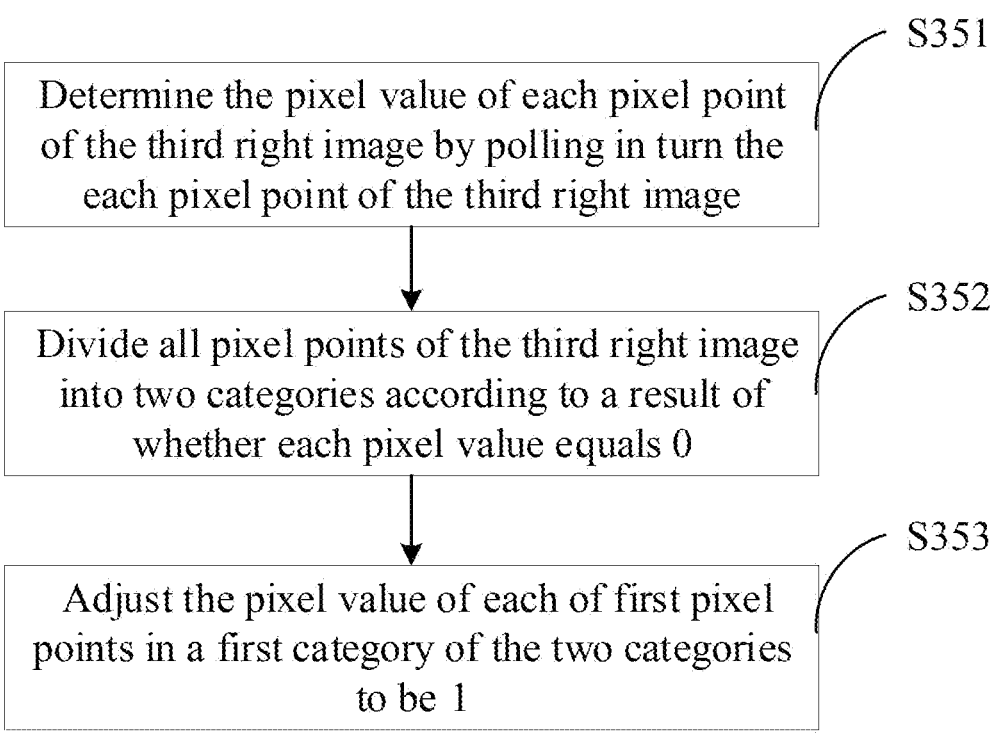
FIG. 5 is a flow chart of sub-blocks of block S35 in FIG. 3.

Referring to FIG. 3 and FIG. 5 together, FIG. 5 is a flowchart of sub-blocks of block S35 in FIG. 3.

Specifically, in block S35 of FIG. 3, the obtaining the mask image by performing the binarization processing on the pixel value of each pixel point of the third right image may include the following sub-blocks:

S351, the electronic device determines the pixel value of each pixel point of the third right image by polling in turn each pixel point of the third right image.

S352: the electronic device divides all pixel points of the third right image into two categories according to whether each pixel value equals 0.

In this embodiment, a pixel value of each of first pixel points in a first category of the two categories is not equal to 0, and a pixel value of each of second pixel points in a second category of the two categories is equal to 0.

In this embodiment, the first pixel points can be converted from the first left image to the third right image, and can be regarded as normal pixel points, i.e., pixel points which are not problematic. The second pixel points cannot be converted from the first left image to the third right image, and can be regarded as problematic pixel points.

S353, the electronic device adjusts the pixel value of each of the first pixel points to be 1.

In this embodiment, the electronic device polls in turn each of pixel points of the third right image, divides all the pixel points into the two categories according to the result of whether the pixel value equals 0, and then adjusts the pixel value of each of pixel points whose pixel value is not 0 to be 1. In this way, the pixel values of all the pixel points of the third right image are 1 or 0, thus completing the binarization process and generating the mask image.

Figure 6:
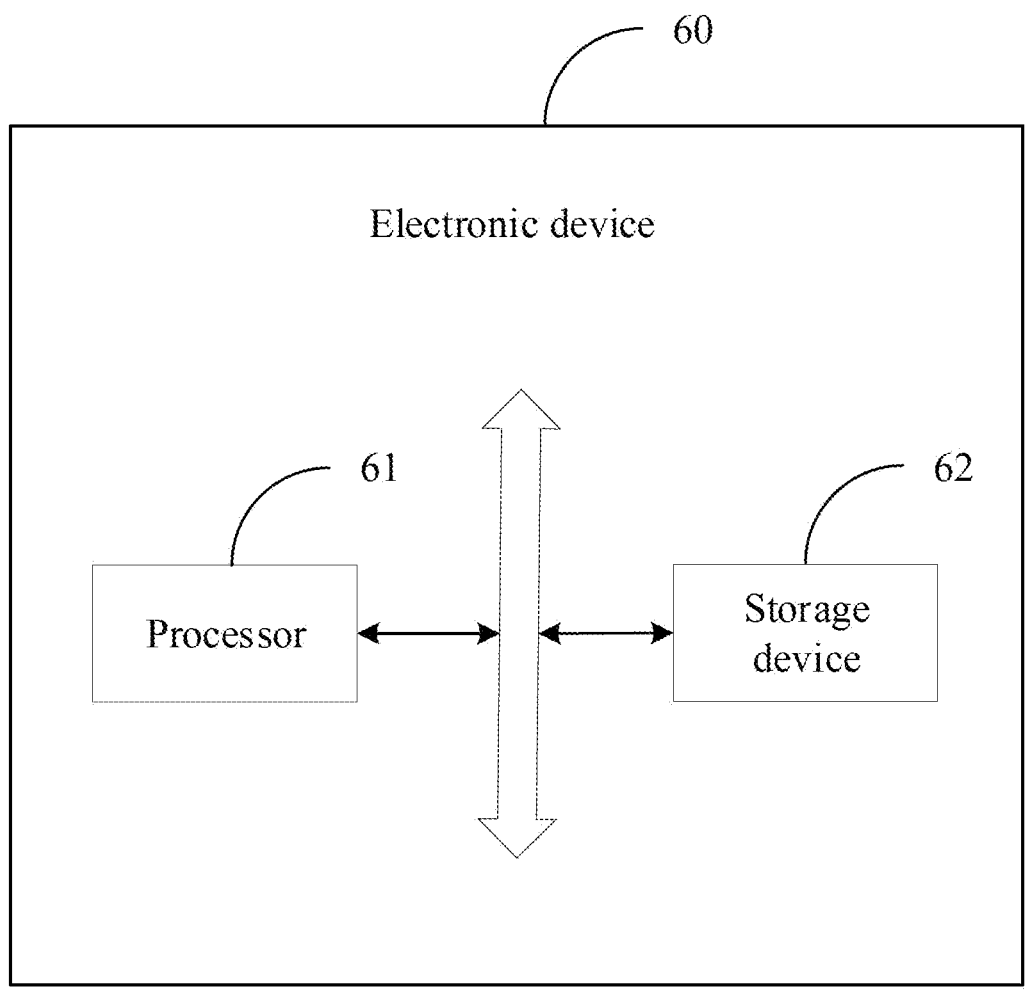
FIG. 6 is a schematic structural diagram of an electronic device according to an embodiment of the present disclosure.

FIG. 6 is a schematic structural diagram of an electronic device 60 according to an embodiment of the present disclosure. The electronic device 60 can be a vehicle-mounted computer or a mobile terminal carried by a driver of the vehicle 100.

Referring to FIG. 6, the electronic device 60 may include at least one processor 61 and a storage device 62. The at least one processor 61 may run a computer program or code stored in the storage device 62 to implement the method for training the depth estimation model and the depth estimation method of the embodiments of the present disclosure.

The at least one processor 61 may be a central processing unit (CPU), or other general-purpose processors, a digital signal processor (DSP), a disclosure specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The at least one processor 61 is a control center of the electronic device 60, and uses various interfaces and lines to connect each part of the electronic device 60.

The storage device 12 can be used to store computer programs and/or modules, and the at least one processor 61 executes or obtains the computer programs and/or modules stored in the storage device 62, and calls up the data stored in the storage device 62, such that various functions of the electronic device 60 are realized. The storage device 62 may mainly include an area for storing programs and an area for storing data, wherein the area for storing programs may store an operating system, a disclosure program required for at least one function (such as a sound playback function, an image playback function, etc.), and the like; the area for storing data may store the data created according to the use of the electronic device 60. In addition, the storage device 62 may include, but is not limited to, random access memory (Random Access Memory, RAM), read-only memory (Read-Only Memory, ROM), electrically erasable programmable read-only memory (Electrically Erasable Programmable Read-Only Memory, EEPROM)), flash memory or other memory, Compact Disc Read-Only Memory (CD-ROM), Digital Versatile Disc (DVD) or other optical disk storage, magnetic cartridge, magnetic tape, magnetic disk storage or other magnetic storage device, or any other non-volatile storage medium that can be used to store desired information and that can be readable by a computer.

In some embodiments, the computer program stored in the electronic device 60 may include a plurality of functional modules composed of program code segments. The program code of each program segment can be stored in storage device 62 of the electronic device 60 and executed by the processor 61 to achieve blocks S11-S12 as shown in FIG. 2, blocks S31-S38 as shown in FIG. 3, blocks S341-S342 as shown in FIG. 4, and blocks S351-S353 as shown in FIG. 5.

In this embodiment, the computer program stored in the electronic device 600 can be divided into a plurality of functional modules. The module means a series of computer program segments that can be executed by at least one processor 61 and perform fixed functions and are stored in storage device 62.

The program codes are stored in storage device 62 and the at least one processor 61 may invoke the program codes stored in storage device 62 to perform the related function. The program codes stored in the storage device 62 can be executed by the at least one processor 61, so as to realize the function of each module to achieve the method for training the depth estimation model and the depth estimation method of the embodiments of the present disclosure.

In one embodiment of this disclosure, said storage device 62 stores at least one instruction, and said at least one instruction is executed by said at least one processor 61 for the purpose of implementing the method for training the depth estimation model and the depth estimation method of the embodiments of the present disclosure.

In some embodiments, the electronic device 60 may also include a camera device and one or more distance acquisition devices.

It can be understood that the structures illustrated in the embodiments of the present disclosure do not constitute a specific limitation on the electronic device 60. In other embodiments of the present disclosure, the electronic device 60 may include more or less components than shown, or combine some components, or separate some components, or arrange different components.

The embodiments of the present disclosure have been described in detail above in conjunction with the accompanying drawings, but the present disclosure is not limited to the above-mentioned embodiments, and within the scope of knowledge possessed by those of ordinary skill in the art, various aspects can also be made without departing from the purpose of the present disclosure. kind of change.

What is claimed is:

1. A method for training a depth estimation model applied to an electronic device, the method comprising:
   obtaining a pair of images from a training data set, the pair of images comprising a first left image and a first right image;
   obtaining a disparity map by inputting the first left image into a depth estimation model;
   obtaining a second right image by adding the first left image to the disparity map;
   converting the first left image into a third right image according to internal parameters and external parameters of a camera device, comprising: obtaining a second left image by transforming the first left image from a coordinate system of a left camera of the camera device to a world coordinate system according to the internal parameters and the external parameters of the left camera; and obtaining the third right image by transforming the second left image from the world coordinate system to a coordinate system of a right camera of the camera device according to the internal parameters and the external parameters of the right camera;
   obtaining a mask image by performing a binarization processing on a pixel value of each of pixel points of the third right image;
   obtaining a loss value of the depth estimation model by calculating a mean square error of pixel values of all corresponding pixel points of the first right image, the second right image, and the mask image; and
   iteratively training the depth estimation model according to the loss value.

2. The method according to claim 1, wherein the iteratively training the depth estimation model according to the loss value comprises:
   updating parameters of the depth estimation model using a back-propagation algorithm according to the loss value;
   iteratively training the depth estimation model until all of a plurality of pairs of images in the training data set are trained or the depth estimation model converges.

3. The method according to claim 2, further comprising:
   selecting parameters of the depth estimation model with a smallest loss value as final model parameters, when all of the plurality of pairs of images in the training data set are trained.

4. The method according to claim 2, further comprising:
   determining the parameters of the converged depth estimation model as final model parameters.

5. The method according to claim 2, wherein the depth estimation model converges in response that the loss value equals 0.

6. The method according to claim 1, wherein the obtaining the mask image by performing the binarization processing on the pixel value of each of pixel points of the third right image comprises:
   determining the pixel value of each pixel point of the third right image by polling in turn the each pixel point of the third right image;
   dividing all pixel points of the third right image into two categories according to a result of whether each pixel value equals 0, a pixel value of each of first pixel points in a first category of the two categories being not equal to 0, and a pixel value of each of second pixel points in a second category of the two categories being equal to 0; and
   adjusting the pixel value of each of the first pixel points to be 1.

7. The method according to claim 1, further comprising:
   calculating the mean square error of pixel values of three corresponding pixel points of the first right image, the second right image and the mask image according to a formula:

$$MSE = \frac{1}{n}\sum_{i=1}^{n} m_i * (y_i - \hat{y}_i)^2;$$

wherein, MSE represents the mean square error, $m_i$ represents the pixel value of the ith pixel point of the mask image, $m_i$ represents 1 or 0, n represents a total number of all pixel points with $m_i$ being equal to 1 in the mask image, $y_i$ represents the pixel value of the ith pixel point of the first right image, $\hat{y}_i$ represents the pixel value of the ith pixel point of the second right image.

8. The method according to claim 1, further comprising:
acquiring a first image;
obtaining a first depth image by inputting the first image into the depth estimation model, the depth estimation model having been iteratively trained according to the loss value.

9. The method according to claim 8, wherein the obtaining the first depth image by inputting the first image into the depth estimation model comprises:
obtaining a disparity map by inputting the first image into the depth estimation model; and
converting the disparity map into the first depth image.

10. An electronic device comprising:
a storage device;
at least one processor; and
the storage device storing one or more programs, which when executed by the at least one processor, cause the at least one processor to:
obtain a pair of images from a training data set, the pair of images comprising a first left image and a first right image;
obtain a disparity map by inputting the first left image into a depth estimation model;
obtain a second right image by adding the first left image to the disparity map;
convert the first left image into a third right image according to internal parameters and external parameters of a camera device, comprising: obtaining a second left image by transforming the first left image from a coordinate system of a left camera of the camera device to a world coordinate system according to the internal parameters and the external parameters of the left camera; and obtaining the third right image by transforming the second left image from the world coordinate system to a coordinate system of a right camera of the camera device according to the internal parameters and the external parameters of the right camera;
obtain a mask image by performing a binarization processing on a pixel value of each of pixel points of the third right image;
obtain a loss value of the depth estimation model by calculating a mean square error of pixel values of all corresponding pixel points of the first right image, the second right image, and the mask image; and
iteratively train the depth estimation model according to the loss value.

11. The electronic device according to claim 10, wherein the iteratively training the depth estimation model according to the loss value comprises:
updating parameters of the depth estimation model using a back-propagation algorithm according to the loss value;
iteratively training the depth estimation model until all of a plurality of pairs of images in the training data set are trained or the depth estimation model converges.

12. The electronic device according to claim 11, wherein the at least one processor is further caused to:
select parameters of the depth estimation model with a smallest loss value as final model parameters, when all of the plurality of pairs of images in the training data set are trained.

13. The electronic device according to claim 11, wherein the at least one processor is further caused to:
determine the parameters of the converged depth estimation model as final model parameters.

14. The electronic device according to claim 11, wherein the depth estimation model converges in response that the loss value equals 0.

15. The electronic device according to claim 10, wherein the obtaining the mask image by performing the binarization processing on the pixel value of each of pixel points of the third right image comprises:
determining the pixel value of each pixel point of the third right image by polling in turn the each pixel point of the third right image;
dividing all pixel points of the third right image into two categories according to a result of whether each pixel value equals 0, a pixel value of each of first pixel points in a first category of the two categories being not equal to 0, and a pixel value of each of second pixel points in a second category of the two categories being equal to 0; and
adjusting the pixel value of each of the first pixel points to be 1.

16. The electronic device according to claim 10, wherein the at least one processor is further caused to:
calculate the mean square error of pixel values of three corresponding pixel points of the first right image, the second right image and the mask image according to a formula:

$$MSE = \frac{1}{n}\sum_{i=1}^{n} m_i * (y_i - \hat{y}_i)^2;$$

wherein, MSE represents the mean square error, $m_i$ represents the pixel value of the ith pixel point of the mask image, $m_i$ represents 1 or 0, n represents a total number of all pixel points with $m_i$ being equal to 1 in the mask image, $y_i$ represents the pixel value of the ith pixel point of the first right image, $\hat{y}_i$ represents the pixel value of the ith pixel point of the second right image.

17. The electronic device according to claim 10, wherein the at least one processor is further caused to:
acquire a first image;
obtain a first depth image by inputting the first image into the depth estimation model, the depth estimation model having been iteratively trained according to the loss value.

18. The electronic device according to claim 17, wherein the obtaining the first depth image by inputting the first image into the depth estimation model comprises:
obtaining a disparity map by inputting the first image into the depth estimation model; and
converting the disparity map into the first depth image.

19. A non-transitory storage medium having instructions stored thereon, when the instructions are executed by a processor of an electronic device, the processor is caused to perform a method for training a depth estimation model, wherein the method comprises:
obtaining a pair of images from a training data set, the pair of images comprising a first left image and a first right image;

obtaining a disparity map by inputting the first left image into a depth estimation model;

obtaining a second right image by adding the first left image to the disparity map;

converting the first left image into a third right image according to internal parameters and external parameters of a camera device, comprising: obtaining a second left image by transforming the first left image from a coordinate system of a left camera of the camera device to a world coordinate system according to the internal parameters and the external parameters of the left camera; and obtaining the third right image by transforming the second left image from the world coordinate system to a coordinate system of a right camera of the camera device according to the internal parameters and the external parameters of the right camera;

obtaining a mask image by performing a binarization processing on a pixel value of each of pixel points of the third right image;

obtaining a loss value of the depth estimation model by calculating a mean square error of pixel values of all corresponding pixel points of the first right image, the second right image, and the mask image; and iteratively training the depth estimation model according to the loss value.

20. The non-transitory storage medium according to claim 19, wherein the iteratively training the depth estimation model according to the loss value comprises:

updating parameters of the depth estimation model using a back-propagation algorithm according to the loss value;

iteratively training the depth estimation model until all of a plurality of pairs of images in the training data set are trained or the depth estimation model converges.

* * * * *